US011017364B2

(12) United States Patent
Smith et al.

(10) Patent No.: US 11,017,364 B2
(45) Date of Patent: May 25, 2021

(54) SYSTEMS AND METHODS FOR MANAGING FINANCIAL TRANSACTION INFORMATION

(71) Applicant: Finicity Corporation, Murray, UT (US)

(72) Inventors: Steven B. Smith, Murray, UT (US); Nicholas A. Thomas, Murray, UT (US)

(73) Assignee: Finicity Corporation, Murray, UT (US)

( * ) Notice: Subject to any disclaimer, the term of this patent is extended or adjusted under 35 U.S.C. 154(b) by 205 days.

(21) Appl. No.: 15/433,930

(22) Filed: Feb. 15, 2017

(65) Prior Publication Data

US 2017/0352014 A1    Dec. 7, 2017

Related U.S. Application Data

(60) Provisional application No. 62/345,584, filed on Jun. 3, 2016.

(51) Int. Cl.
*G06Q 20/10* (2012.01)
*G06Q 20/40* (2012.01)
*G06Q 20/02* (2012.01)
*G06Q 20/32* (2012.01)
*G06Q 20/22* (2012.01)

(52) U.S. Cl.
CPC ......... *G06Q 20/108* (2013.01); *G06Q 20/027* (2013.01); *G06Q 20/102* (2013.01); *G06Q 20/227* (2013.01); *G06Q 20/3223* (2013.01); *G06Q 20/405* (2013.01)

(58) Field of Classification Search
USPC ..................................... 705/40, 35
See application file for complete search history.

(56) References Cited

U.S. PATENT DOCUMENTS

| | | | | |
|---|---|---|---|---|
| 2004/0260658 A1* | 12/2004 | Dettinger | ........... | G06Q 30/0283 705/400 |
| 2005/0034147 A1* | 2/2005 | Best, Jr. | .................. | H04L 67/24 725/10 |
| 2006/0145831 A1* | 7/2006 | Bornhoevd | .......... | G06Q 10/087 340/521 |
| 2009/0210784 A1* | 8/2009 | Sullivan | .............. | G06F 16/9535 715/238 |
| 2012/0254002 A1* | 10/2012 | Kundagrami | .......... | G06Q 40/02 705/35 |
| 2014/0129303 A1* | 5/2014 | Aiglstorfer | ........ | G06Q 30/0241 705/14.4 |
| 2014/0148140 A1* | 5/2014 | Ahn | .................... | H04L 41/0893 455/418 |

(Continued)

*Primary Examiner* — William E Rankins
(74) *Attorney, Agent, or Firm* — Hovey Williams LLP

(57) ABSTRACT

Systems and methods provide improved control and sharing of financial account and financial transaction information from a plurality of disparate banks to a plurality of disparate customers using a plurality of disparate financial services apps on a plurality of disparate devices. A centralized hub is used to provide communication between disparate bank and customer systems and devices, and a hub provider ensures that disparate financial services apps comply with applicable requirements before being allowed to participate in the information sharing system. The systems and methods provide new mechanisms to share data and new sources by which to monetize and incentivize the sharing of data.

13 Claims, 3 Drawing Sheets

(56) References Cited

U.S. PATENT DOCUMENTS

| | | | | |
|---|---|---|---|---|
| 2014/0365350 | A1* | 12/2014 | Shvarts | G06Q 40/00 705/35 |
| 2015/0026024 | A1* | 1/2015 | Calman | G06Q 40/02 705/35 |
| 2015/0073959 | A1* | 3/2015 | Connors | G06Q 40/00 705/35 |
| 2015/0348083 | A1* | 12/2015 | Brill | G06O 30/0222 705/14.23 |
| 2015/0350211 | A1* | 12/2015 | Burgess | H04L 63/10 726/30 |

* cited by examiner

SYSTEMS AND METHODS FOR MANAGING FINANCIAL TRANSACTION INFORMATION

CROSS-REFERENCED APPLICATIONS

This application claims the benefit of priority from United States Provisional Patent Application No. 62/345,584 which was filed on Jun. 3, 2016.

BACKGROUND OF THE INVENTION

1. Field of the Invention

The present invention relates to financial management systems, and more particularly to systems and methods for managing and using financial transaction information in controlled and permissioned ways.

2. Background and Related Art

Banks and bank-like institutions (e.g. credit unions, savings and loans, etc., all collectively referred to herein as "bank" or "banks") manage and process transactions on significant amounts of money from and to their customers, including receiving deposits of funds from some customers, issuing loans to other customers, and providing checking, credit card, and debit card services, among other services. The banks process transactions on the various accounts managed by the banks, and report on the status of their customers' accounts from time to time or on demand. While new systems and methods become available from time to time to facilitate customers' knowledge of the status of their accounts and transactions that are occurring on their accounts, current systems and methods remain in need of refinement.

BRIEF SUMMARY OF THE INVENTION

Systems and methods provide improved control and sharing of financial account and financial transaction information from a plurality of disparate banks to a plurality of disparate customers using a plurality of disparate financial services apps on a plurality of disparate devices. A centralized hub is used to provide communication between disparate bank and customer systems and devices, and a hub provider ensures that disparate financial services apps comply with applicable requirements before being allowed to participate in the information sharing system. The systems and methods provide new mechanisms to share data and new sources by which to monetize and incentivize the sharing of data.

In accordance with implementations of the invention, a system for facilitating and controlling multi-application access to banking transaction data includes a hub computer system communicatively coupled to a plurality of disparate bank computer systems. The hub computer system may include a communications mechanism to receive financial transaction information pushed from the plurality of disparate bank computer systems, a processing system to parse the financial transaction information and to identify a customer associated with each financial transaction within the financial transaction information, a routing system adapted to route information associated with each financial transaction to a financial services app operating on a remote customer device, and a communications mechanism in communication with the remote customer device that transmits the information routed by the routing system to apps on appropriate customer devices.

The communications mechanism to receive financial transaction information may include a network interface device. Similarly, the communications mechanism in communication with the remote customer device may include a network interface device. The hub computer system may include a billing system that tracks financial transaction information sent to each customer device and generates an invoice based on a number of transactions per device.

The hub computer system may include a referral system adapted to receive submission of a financial services app from a referred app developer and to track a referral source of the app developer. The referral system may be adapted to generate instructions for providing a referral fee to the referral source of the app developer when the financial services app is approved for use with the hub computer system.

The hub computer system may include an authorization system adapted to receive instructions to provide authenticated financial information to a third-party service provider from a customer and a communications mechanism in communication with a computer system of the third-party service provider.

In accordance with further implementations of the invention, a method for facilitating and controlling multi-application access to banking transaction data includes providing a hub computer system at least intermittently communicatively connected to a plurality of disparate bank computer systems, a plurality of app provider systems, a plurality of disparate customer computer systems and a plurality of disparate financial services apps operating on the plurality of disparate customer computer systems. The method also includes receiving financial account information and financial transaction information from the bank computer systems, identifying users associated with the financial account information and the financial transaction information and identifying apps used by the identified users, routing and sending the financial account information and the financial transaction information to the various apps and customer computer systems used by the identified users, and tracking the transactions sent to each app and user to facilitate per-transaction billing for information passing through the hub computer system.

The method may also include receiving a submission of a new proposed financial services app for approval for use with the hub computer system and, upon approval of the proposed financial services app for use with the hub computer system, tracking customers who purchase and use the proposed financial services app. The method then permits routing and sending financial account and financial transaction information to the customers who purchase and use the proposed financial services app.

The methods discussed above may further include receiving information relating to a referral source for the submission of the new proposed financial services app and providing a referral fee to the referral source upon approval of the proposed financial services app for use with the hub computer system. The methods may also include ensuring that the new proposed financial services app complies with requirements imposed upon financial services apps prior to approval of the proposed financial services app for use with the hub computer system.

The methods may further include calculating a payment to each bank based on a volume of financial transaction information sent from the bank computer systems associated with each bank.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
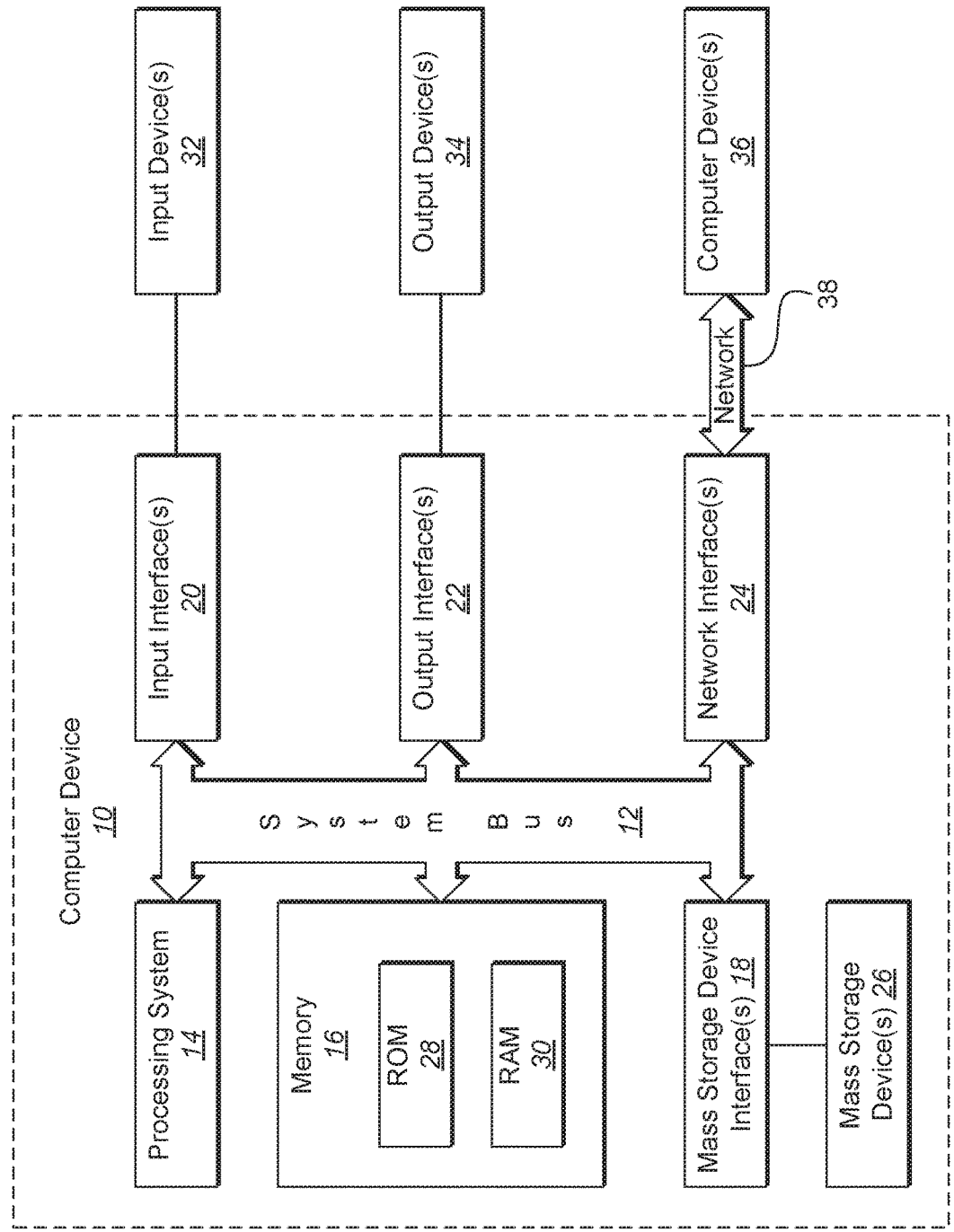
FIG. 1 shows an exemplary computer system for use with embodiments of the invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

In the description and in the claims, the terms "bank," "banking," and the like should be understood to refer not only strictly to banks but also to any bank-like institution (e.g. credit unions, savings and loans, other financial institutions, etc.) that manages customers' money and provides bank-like services such as savings and savings-like vehicles, checking and money market services, debit card services, credit card services, and the like.

Systems and methods provide improved control and sharing of financial account and financial transaction information from a plurality of disparate banks to a plurality of disparate customers using a plurality of disparate financial services apps on a plurality of disparate devices. A centralized hub is used to provide communication between disparate bank and customer systems and devices, and a hub provider ensures that disparate financial services apps comply with applicable requirements before being allowed to participate in the information sharing system. The systems and methods provide new mechanisms to share data and new sources by which to monetize and incentivize the sharing of data.

In accordance with embodiments of the invention, a system for facilitating and controlling multi-application access to banking transaction data includes a hub computer system communicatively coupled to a plurality of disparate bank computer systems. The hub computer system may include a communications mechanism to receive financial transaction information pushed from the plurality of disparate bank computer systems, a processing system to parse the financial transaction information and to identify a customer associated with each financial transaction within the financial transaction information, a routing system adapted to route information associated with each financial transaction to a financial services app operating on a remote customer device, and a communications mechanism in communication with the remote customer device that transmits the information routed by the routing system to apps on appropriate customer devices.

The communications mechanism to receive financial transaction information may include a network interface device. Similarly, the communications mechanism in communication with the remote customer device may include a network interface device. The hub computer system may include a billing system that tracks financial transaction information sent to each customer device and generates an invoice based on a number of transactions per device.

The hub computer system may include a referral system adapted to receive submission of a financial services app from a referred app developer and to track a referral source of the app developer. The referral system may be adapted to generate instructions for providing a referral fee to the referral source of the app developer when the financial services app is approved for use with the hub computer system.

The hub computer system may include an authorization system adapted to receive instructions to provide authenticated financial information to a third-party service provider from a customer and a communications mechanism in communication with a computer system of the third-party service provider.

In accordance with further embodiments of the invention, a method for facilitating and controlling multi-application access to banking transaction data includes providing a hub computer system at least intermittently communicatively connected to a plurality of disparate bank computer systems, a plurality of app provider systems, a plurality of disparate customer computer systems and a plurality of disparate financial services apps operating on the plurality of disparate customer computer systems. The method also includes receiving financial account information and financial transaction information from the bank computer systems, identifying users associated with the financial account information and the financial transaction information and identifying apps used by the identified users, routing and sending the financial account information and the financial transaction information to the various apps and customer computer systems used by the identified users, and tracking the transactions sent to each app and user to facilitate per-transaction billing for information passing through the hub computer system.

The method may also include receiving a submission of a new proposed financial services app for approval for use with the hub computer system and, upon approval of the proposed financial services app for use with the hub computer system, tracking customers who purchase and use the proposed financial services app. The method then permits routing and sending financial account and financial transaction information to the customers who purchase and use the proposed financial services app.

The methods discussed above may further include receiving information relating to a referral source for the submission of the new proposed financial services app and providing a referral fee to the referral source upon approval of the proposed financial services app for use with the hub computer system. The methods may also include ensuring that the new proposed financial services app complies with requirements imposed upon financial services apps prior to approval of the proposed financial services app for use with the hub computer system.

The methods may further include calculating a payment to each bank based on a volume of financial transaction information sent from the bank computer systems associated with each bank.

There are significant hurdles that banks and other bank-like institutions face as they seek to provide their customers the desired customer experience. In light of recent changes in laws and regulations (e.g., Dodd-Frank and its accompanying regulations) and changes in customer expectations, customers are coming more and more to regard their banking information as their data. In contrast, banks wish to exercise control over their customers' data, and want to receive compensation for making that data available. Additionally, customers are becoming ever-more sophisticated in the ways in which they want to consume and access their banking data. Consumers have progressed from viewing and reconciling monthly statements, to accessing their account information online through their banks' websites and a home computer or laptop, to accessing such information using mobile devices, banks' own mobile apps, and third-party programs and apps, including those provided by aggregators. While banks are going to increasing lengths to provide their customers with in-house apps that allow customers to access their data and while banks further wish to maintain a consistent look and feel of their websites and mobile apps, the banks are typically unable to provide the quality of user experience and functionality that is commonly being provided by the financial technology industry.

The proliferation of third-party apps and programs has created additional difficulties for financial institutions. Banks and other financial institutions are ill-equipped to properly vet more than a few such applications to ensure that they are compatible with the banks' and customers' data and that the applications provide adequate security and authentication to protect their customers' data. Instead, the banks must either accept providing data to untrusted apps or risk upsetting their customers (and losing them to other banks) by refusing to support untrusted apps.

Embodiments of the invention address the needs of banks and of the banks' customers by providing a qualification and onboarding service to banks, allowing banks to leverage the abilities and features provided by apps developed by the financial technology industry without requiring the banks to closely review new apps and monitor existing apps. The service is provided through a hub that serves to qualify apps and that also serves to pass data from the banks to any qualified apps. The hub also provides a benefit of providing a central service through which banks can push data changes as they occur, avoiding the need to respond to requests for data pulls as with current aggregator systems.

Utilizing an app hub model also provides new mechanisms by which the banks can control their data and monetize access to that data. In a traditional model by which the banks vet and approve each app separately, the only way in which the banks can monetize providing access to their data is to monitor each individual app's use of data and to bill each app for access to such data. While this model may suffice for a situation with many users using a very few apps, this model becomes unwieldy as the number of apps increase, where the cost of billing and collecting small amounts from each app provider may fail to offset the revenue received from the various apps, even without addressing the costs of vetting and approving such apps in the first place.

In contrast, the hub model provides banks and the hubs with an efficient market that avoids such problems. Initially, the hub provides the labor of vetting and approving apps to participate in the data received from the various banks. The hub is then able to provide a central pass-through role by which it receives the data from all of the member banks for all of the member apps and customers, and then distributes the received data to the various participating apps and customers. As each bank only sends data to a single recipient (the hub), billing for the data received becomes simple and straightforward, based simply on the amount of data passed on and/or the number of participating customers from that bank whose data is delivered. Meanwhile, as the hub may receive information from multiple banks for each onboarded app, it can aggregate the relevant cost information for all data accessed by each app and invoice each app provider appropriately.

The hub configuration makes possible additional or alternative revenue models. As each app that participates in the system represents a possible revenue stream to the hub provider, the hub provider may provide a bounty to banks for referrals of apps to the hub provider for onboarding. Once the app has satisfied the requirements to participate with the hub and provides adequate revenue to the hub provider, the hub provider may notify the referring bank and pay an appropriate one-time, limited-time, or ongoing referral fee. In this way, the bank has an additional mechanism to participate in a subscription revenue stream through which the app provider participates in the system.

Similarly, the hub configuration provides the data aggregator (the hub provider) with an alternate revenue mechanism. In the traditional aggregator model, the aggregator typically charges a per-user per-month fee. In the hub model, the hub provider essentially creates and maintains the marketplace through which the banks' customer data is delivered and is able to participate by receiving a cut of each transaction. This transaction-based model is facilitated by a full or partial transition from the older "pull" model of obtaining data from the banks, by which the aggregator or other app provider would request updates from the banks from time to time, and the customers individual apps would then request updates from the aggregator or other app provider from time to time, with most requests at each stage locating no new transactions. In the new model, the banks actively push each new transaction to the hub provider as the transaction occurs, and the hub provider pushes new transactions to the appropriate apps/app providers as they are received so that updates occur in real time while using fewer network and computing resources. With this transaction-based system, charges to the various parties can be on a per-transaction basis.

As another alternative, each participant can participate on a percentage basis in subscription fees received from the customers using the various apps. The app provider receives a subscription fee from each subscriber who is a bank customer. The hub provider receives a subscription fee essentially representing some portion of the fees collected by the app provider from each app provider having an app on the hub marketplace, either on a per-app basis, or on a per-customer basis. The banks then receive a subscription fee from the hub provider essentially representing some portion of the fees collected by the hub provider from the app providers on whatever appropriate basis, such as a per-customer basis, on a fixed fee basis, or on some other agreed-upon basis.

The hub-based model also ensures that banks and their customers have ultimate control over their data and how that data is accessed and shared. The hub provider provides a critical role as it onboards each app that joins the marketplace. The hub first ensures data is adequately protected during the app approval process. During this process, the hub provider ensures that the app to be approved complies with all relevant acceptance criteria and quality control issues. Because each app submitted for approval will generally be utilized by multiple customers across multiple banks, the hub is adequately compensated for its work in vetting the proposed app since revenues are to be received from transactions through multiple users and banks. Alternatively or additionally, the hub provider may charge the app provider fees for the app review and approval process, which the app provider will be willing to pay since there is only a single approval process instead of multiple processes for multiple banks.

During the app approval process, the hub provider can ensure that each app complies with relevant data security, regulatory, and other compliance issues. In some instances, the hub provider can apply different requirements to each app submitted for approval depending on the banks that the app provider wishes to certify its apps for use with and the relevant requirements imposed by or in conjunction with such banks. As some banks may have more stringent requirements in some areas, the hub provider can ensure compliance with such requirements when the app provider expresses interest in compatibility with such banks. Such requirements may include authentication requirements, data protection requirements, communication requirements, look-and-feel requirements, regulatory requirements, and any other relevant requirements.

For example, certain banks may require that apps provide the ability to provide a pass-through look and feel matching the banks' look and feel when customers are accessing data from those banks. In such cases, the hub provider may ensure that the apps submitted for review are capable of providing the required pass-through look and feel before approving such apps. In instances where an app submitted for review will not be used with banks having such requirements, the app may be approved without complying with such requirements. Similar considerations may be applied to each app seeking approval for use with the hub marketplace.

With the hub acting as a centralized approval and control system, it becomes straightforward to provide user and bank control over access to bank-provided customer data. If and as regulations or other requirements applicable to any apps change, the hub can be used to immediately cut off access to any noncompliant apps until such time as the app providers modify the apps to be compliant. At any time, the customer can revoke access granted to the customer's app or apps, and the hub is immediately able to cut off all further access to that customer's data regardless of how many banks the app was retrieving or receiving information from. Each bank can similarly revoke access previously granted to certain apps in the unlikely event that the bank becomes aware of an unresolved problem with that app, and the hub can then discontinue providing information between the bank and the revoked app, potentially without revoking access between the app and other banks. In certain instances, bank-instituted revocation may occur relevant to only certain customers rather than app-wide. In certain instances, given the trend toward increased consumer control over their own data, the hub system may only allow the customer to control or limit app access to the customer's data.

In addition to the control benefits outlined above, embodiments of the hub system provide efficiency benefits over current systems. As discussed above, current systems in which the aggregator submits a pull request for new transactions from the banks, and the financial technology apps also submit pull requests from the aggregator site are inefficient. A majority of pull requests find no new transactions. Additionally, it can take significant amounts of time for transactions that have occurred to be reflected in consumers' systems, depending on factors such as the timing of processing of the transactions by the involved banks and other institutions, timing of the pull request by the aggregator, and timing of the pull request by the users' apps or other financial management software. Using the hub system improves upon the old system's inefficiencies through the use of a push system and the publisher-hub-subscriber model provided by the hub. The banks and other transaction publishers push new transactions to the hub as they occur, making them immediately available to the hub. Meanwhile, the hub immediately processes and pushes new transactions that it receives to the subscriber apps. Thus, subscribers are able to receive and view new transactions in near real time.

Other subscribers can see similar benefits. Financial management programs are one major market for these improvements, but other markets may include markets such as online lending markets, expense management markets, etc. Essentially any market in which obtaining very up-to-date financial transaction information may benefit from the hub system and methods described herein. The consumer's control over his or her own data is able to remain essentially absolute, while banks who generate and provide the data are able to be compensated accordingly. Thus, when a consumer wishes to provide data for a loan application, the consumer may provide authorization for sharing data through the hub with the lender, and the hub and the appropriate banks may receive compensation as outlined herein. Meanwhile, the hub is able to ensure that all appropriate regulations and other requirements are complied with, as the hub provider has vetted all access apps to ensure such.

As part of the system established by the hub, the banks that provide user data can be made aware of how that data is being used. This information may be used to facilitate additional services to the consumer, such as targeted loan offerings, fraud prevention and consumer protection, and the like. In some embodiments, the customer may be able to control what the banks are able to know regarding how the customer's transaction data is being used by the customer to increase the customer's privacy.

As embodiments of the invention utilize computers, computer networks, and various computing resources (e.g. a variety of wireless mobile devices such as smart phones and tablets, laptop computers, and the like, FIG. 1 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook or laptop computer, a netbook, a personal digital assistant ("PDA") or other hand-held device, a tablet computer, a workstation, a minicomputer, a mainframe, a supercomputer, a multi-processor system, a network computer, a processor-based consumer electronic device, a computer device integrated into another device or vehicle, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
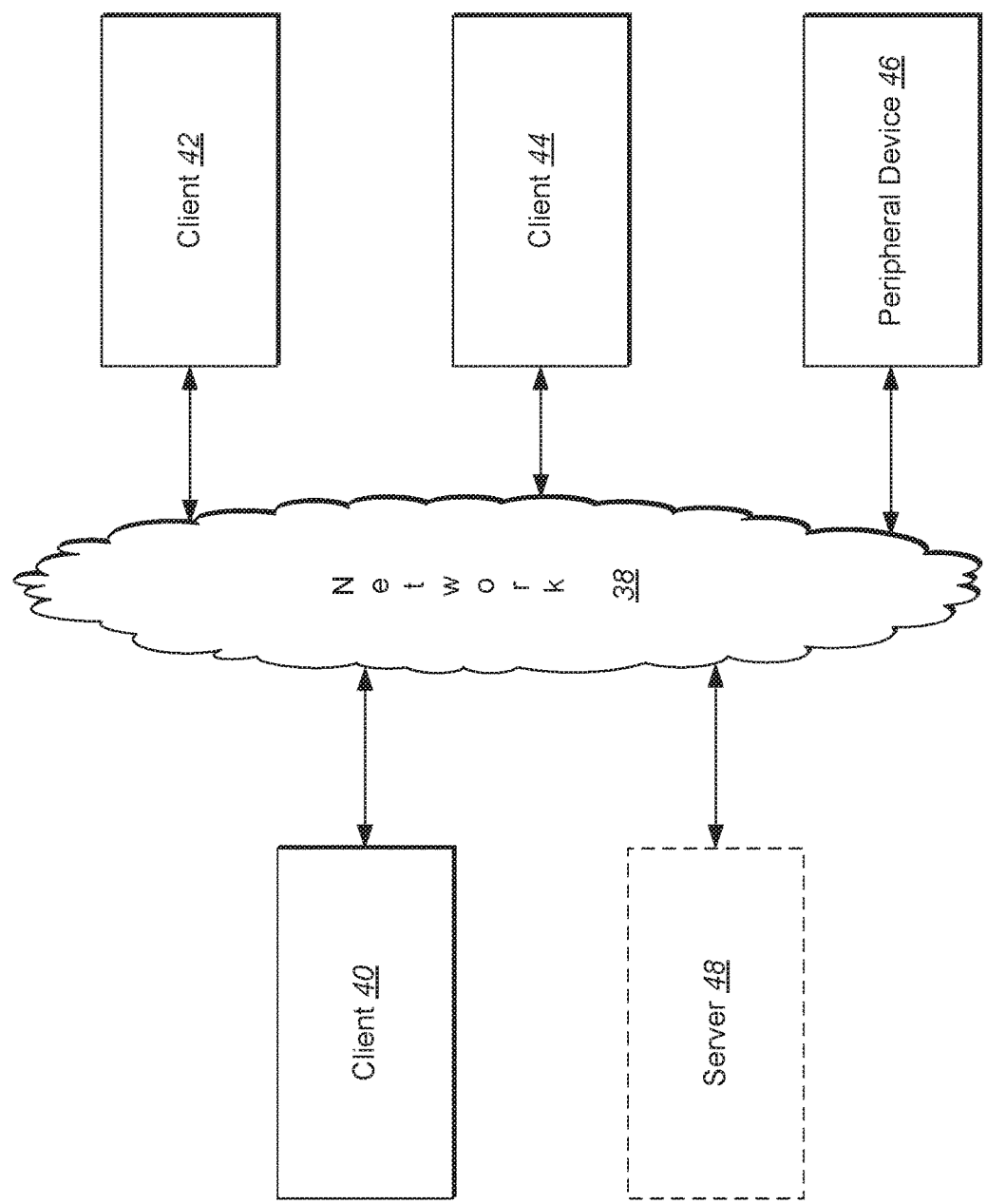
FIG. 2 shows an exemplary networked computer system for use with embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices (illustrated as multifunctional peripheral (MFP) MFP 46) across network 38. While FIG. 2 illustrates an embodiment that includes a client 40, two additional clients, client 42 and client 44, one peripheral device, MFP 46, and optionally a server 48, which may be a print server, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 2, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

Figure 3:
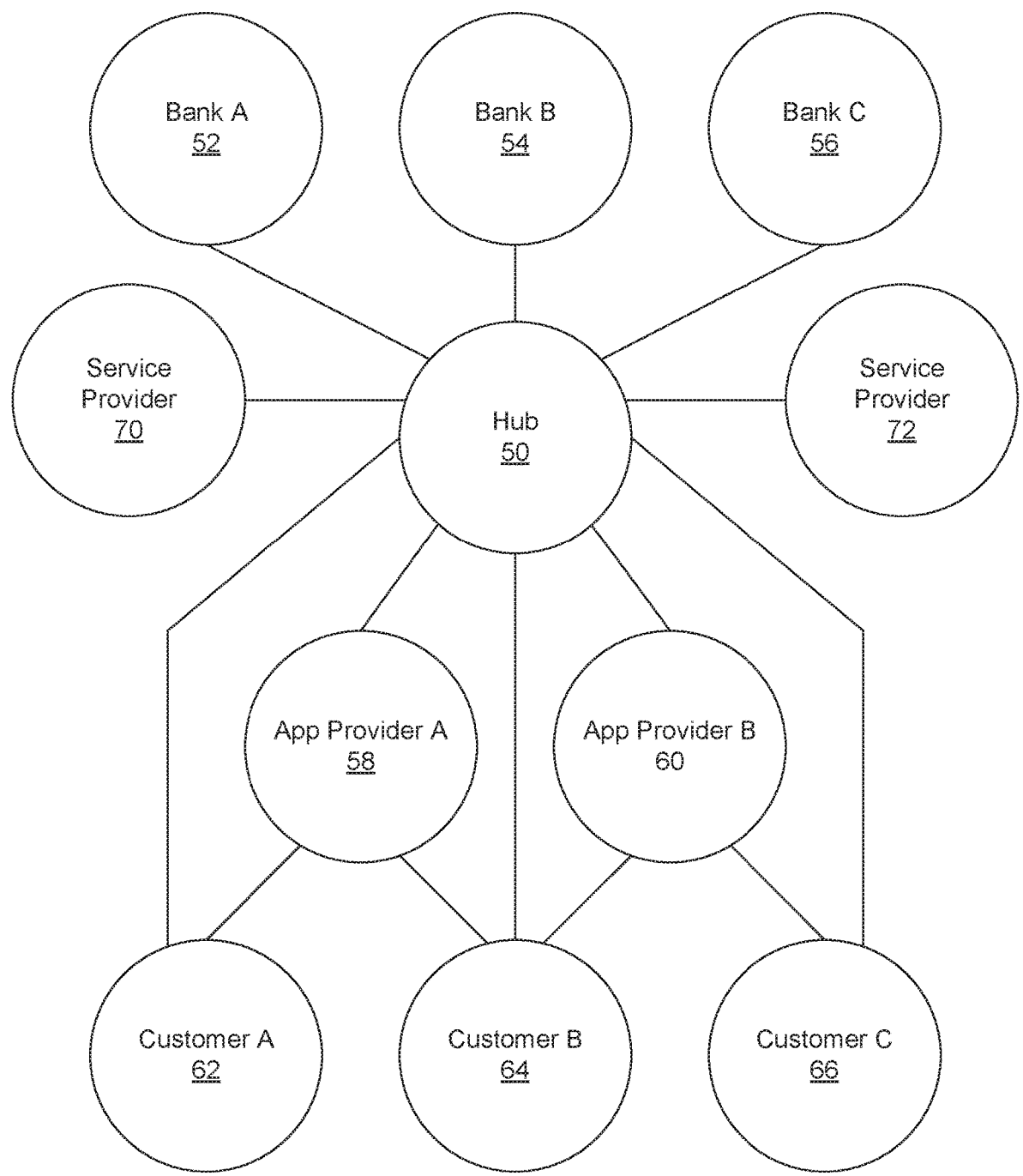
FIG. 3 shows an example of communications connections with a hub according to embodiments of the invention.

FIG. 3 illustrates a representative schematic showing the relationships between banks, a hub provider, app providers, and customers in accordance with embodiments of the invention. A hub provider provides a hub 50. The hub 50 is communicatively connected to one or more networks 38, such as the Internet, such that the hub 50 can communicate with banks, app providers, and/or customers of the app providers. In the illustrated example, the hub 50 is in communication with three banks, Bank A 52, Bank B 54, and Bank C 56. All of these banks are able to push transaction information to the hub 50 as the transactions occur. Alternatively, the hub 50 may be configured to pull transactions from time to time, such as after a period when communication from one of the banks has been lost.

Each of the banks may have an agreement with the hub provider whereby the hub provider provides app vetting services to the banks and receives the transaction information from the banks. The various agreements may include providing compensation to the banks for the transaction information received from the banks, and the agreements may also include provisions for providing referral fees to the banks for referrals of app providers received from the banks. In this way, the hub provider begins to establish an app marketplace centered on the hub 50 serving as a gatekeeper for the apps and as distribution point for the banks' transaction information. Notably, the banks only need communicate transaction information to a single hub 50 and do not need to communicate individually with each individual app or consumer. The hub 50 handles all such communication.

Various third party app providers wish to provide financial technology apps (e.g., financial management apps) to consumers where the apps are able to receive (via pull or push) financial transaction information from one or more of the banks, and wish to maximize the banks with which their apps will function. These app providers may become aware of the hub provider in any fashion, either directly or via referral. Where the app providers become aware of the hub provider via a referral from a bank affiliated with the hub provider, the hub provider may provide a referral fee (either flat fee or some sort of commission on receipts) to the referring bank once the app provider has submitted an app that has been approved for use on the hub system.

The hub provider serves as a gatekeeper, ensuring that all apps submitted to the hub 50 for review satisfy the various requirements imposed by law, regulation, and the applicable banks for obtaining access to the financial transaction data. The requirements may include, for example, look-and-feel requirements, authentication requirements, privacy requirements, stability and functionality requirements, security requirements, or any other type of requirement. The hub provider is incentivized to work with the app provider to ensure that the app is eventually approved for use in the financial transaction marketplace, and will work with the app provider to make sure that any deficiencies of the proposed apps are addressed. In this way, the hub provider is able to realize an immediate (through fees charged to the app provider) and/or eventual (through transaction- or user-based fees) revenue stream from the app providers' customers' use of the approved apps.

In a traditional relationship between banks and app providers, each bank would contract individually with each app provider, and the bank would perform whatever due diligence was necessary to ensure that the proposed app functioned appropriately with the bank's systems and that the app applied with all necessary requirements. Such a system generally limits the number of apps that can function with each bank, as banks are unwilling to invest the time and resources necessary to review all possible apps. In contrast, the hub system illustrated in FIG. 3 allows essentially limitless numbers of banks to interact appropriately with essentially limitless numbers of app providers and their apps, as the hub provider performs the review and approval functions. Thus, while FIG. 3 illustrates an example with three banks and with two app providers, App Provider 58 and App Provider 60, it should be understood that this figure is only representative, and that the number of banks could be any number, including in the thousands, and the number of app providers could be any number, also including in the thousands. All are related through the unifying hub 50 provided by the hub provider.

The banks each have their own proprietary computer systems that maintain their own account and transaction information. The hub 50 may include a variety of computer equipment, such as servers, programs, hardware, firmware, and software, each providing functionality as discussed herein.

Once apps are approved for use by the hub provider 50, the app providers begin selling their apps to customers of the various banks. FIG. 3 illustrates customers as Customer A 62, Customer B 64, and Customer C 66. The various apps may have a variety of functionalities and some customers may wish to have multiple apps through which to access and understand their financial account and transaction data. As customers purchase the various apps, the apps connect through the hub 50 (e.g., intermittently when a communications connection is available to the applicable device) to receive financial account and transaction data via push (as transactions occur) from the hub 50 or via pull (e.g., when the device on which the app is installed has been without a communications connection for some time and executes a pull request upon reestablishment of a communications connection.

As discussed previously, systems and methods in accordance with the hub model of controlling financial transaction and account information facilitates customer-controlled sharing of their financial data. For example, the hub 50 may also be in communicative connection with one or more service providers such as lenders, stores, or other service providers, illustrated as Service Provider 70 and Service Provider 72. These service providers may have need to obtain financial information of one of the customers, such as in conjunction with a loan or purchase, signing up for a service, etc. The customer may wish to authorize sharing of certain financial data with the service provider. When the customer does so, the financial data may be shared through the hub 50, whereby the service provider can be assured that the shared financial data is authenticated and up-to-date. Such sharing of data is able to occur always and only with the permission of the customer whose data it is.

The foregoing examples illustrate how the functionality of the hub 50 centralizes communications across various institutions while simplifying the manners in which banks are able to provide and ensure secure access to their customers' data without requiring each bank to engage in the difficult process of vetting every possible consumer financial app. Additionally, banks will not be required to offer or update their own apps to provide the newest and best technology offered by the financial technology industry. Instead, the hub system described herein allows banks and their customers to obtain the benefits of the best apps without significant outlay by the banks, allowing the banks to focus on providing the best banking services while the app providers can focus on providing the best and most functional apps. Essentially, through embodiments of the invention, all parties benefit.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A system for facilitating and controlling multi-application access to banking transaction information, comprising:
    a plurality of disparate member banks wherein each disparate member bank comprises a disparate member bank computer system hosting customer financial transaction information and configured to push the financial transaction information in real-time to a hub;
    a plurality of disparate member financial services apps provided by a plurality of app providers unaffiliated with the member banks, the plurality of disparate member financial services apps being configured for use by a plurality of customers to control his or her personal financial transaction information;
    a hub computer system comprising a server communicatively coupled to the plurality of disparate member bank computer systems and the plurality of disparate member financial services apps wherein the hub computer system is configured to process communications between the plurality of member banks and the plurality of disparate member financial services apps to ensure the financial transaction information is passed between each member bank and each disparate member financial services app only when each disparate member financial services app complies with prerequisites selectively set by the member bank hosting the customer financial transaction information, the hub computer system comprising:
        a communications mechanism to receive the financial transaction information pushed from the plurality of disparate member bank computer systems to the hub computer system;
        a processing system wherein the financial transaction information is parsed and the customer associated with each financial transaction is identified within the financial transaction information; a routing system wherein the routing system is adapted to route the information associated with each financial transaction to the identified customer through one of the disparate member financial services apps operating on a remote customer device; and
        a communications mechanism in communication with the remote customer device that transmits the information routed by the routing system to one of the disparate member financial services apps on the remote customer device of the identified customer;
    wherein the hub is configured to vet each disparate member financial services app for compliance in handling the financial transaction information so that the financial transaction information is only routed and communicated after the hub computer system has verified at least one time that each disparate member financial services app complies with the prerequisites set by the member bank hosting the financial transaction information, the steps for verifying compliance comprising:
        ensuring the disparate member financial services app complies with selectively and uniquely pre-determined acceptance criteria and quality control standards set by each member bank;
        ensuring the disparate member financial services app complies with selectively and uniquely pre-determined information security, regulatory and compliance standards predetermined by each respective member bank; and
        ensuring the disparate member financial services app complies with pre-determined authentication requirements, information protection requirements, and communication requirements;
    wherein each bank only sends data to the hub, each bank billing for the data received based on the amount of data from that bank whose data is delivered;
    wherein the hub is adapted to receive information from multiple banks of the plurality of disparate member banks for each disparate member financial services app that becomes a disparate member financial services app; and
    wherein the hub is further configured to track the amount of financial transaction information passed between the member banks and each disparate member financial services app and allocate a cost for all data accessed by each disparate member financial services app and invoice each app provider of the plurality of app providers.

2. The system as recited in claim 1, wherein the communications mechanism to receive financial transaction information comprises a network interface device.

3. The system as recited in claim 1, wherein the communications mechanism in communication with the remote customer device comprises a network interface device.

4. The system as recited in claim 1, wherein the hub computer system comprises a billing system; wherein the billing system tracks financial transaction information sent to each customer device and generates an invoice based on a number of transactions per device.

5. The system as recited in claim 1, wherein the hub computer system comprises a referral system adapted to receive submission of one of the disparate member financial services apps from a referred app developer and to track a referral source of the app developer.

6. The system as recited in claim 5, wherein the referral system is adapted to generate instructions for providing a referral fee to the referral source of the app developer when the disparate member financial services app provided by the app developer is approved for use with the hub computer system.

7. The system as recited in claim 1, wherein the hub computer system further comprises:
   an authorization system, wherein the authorization system is adapted to receive instructions to provide authenticated financial transaction information to a third-party service provider from a customer; and
   a communications mechanism in communication with a third-party computer system of the third-party service provider.

8. A method for facilitating and controlling multi-application access to banking transaction data, comprising:
   providing a hub computer system comprising a server at least intermittently communicatively connected to a plurality of disparate member bank computer systems maintained by disparate banks and hosting customer financial information which disparate member bank computer systems push information from the disparate member bank computer systems to the hub computer system in real time, a plurality of app provider systems maintained by app providers, a plurality of disparate customer computer systems and a plurality of disparate member financial services apps operating on the plurality of disparate customer computer systems which plurality of disparate member financial services apps are used by customers to access the customer financial information hosted on the disparate member bank computer systems wherein the hub computer system is configured to parse and route each of the plurality of the disparate customer financial information maintained by the disparate banks from the banks hosting the customer financial information and pushed to the hub computer system by the disparate member bank computer systems on to the plurality of disparate financial services apps on the customer computer systems wherein the hub computer system calculates a fee for the provided routing service;
   wherein the hub computer system provides vetting and approving the plurality of disparate member financial services apps to participate in data received from the disparate banks, the steps of vetting and approving comprising:
      ensuring each disparate member financial services app complies with pre-determined acceptance criteria and quality control standards set by each bank;
      ensuring each disparate member financial services app complies with pre-determined information security, regulatory and compliance standards predetermined by each respective bank; and
      ensuring each disparate member financial services app complies with pre-determined authentication requirements, information protection requirements, and communication requirements;
   distributing the received data to the plurality of disparate member financial services apps and disparate customer computer systems;
   wherein each bank only sends data to the hub computer system;
   billing for the data received from the disparate banks based on the amount of data routed from each bank hosting the data that is delivered to the disparate member financial services apps, the steps of billing comprising:
      receiving information from multiple banks of the plurality of disparate banks for each disparate member financial services app;
      aggregating the relevant cost information for all data accessed by each disparate member financial services app and invoicing each app provider providing the plurality of disparate member financial services apps;
      receiving financial account information and financial transaction information from the disparate member bank computer systems;
      identifying users associated with the financial account information and the financial transaction information and identifying from among the plurality of disparate member financial services apps which financial services app is being used by the identified users;
      routing and sending the financial account information and the financial transaction information to the plurality of disparate member financial services apps and plurality of disparate customers computer systems used by the identified users; and
      tracking the transactions sent to each disparate member financial services app and user to facilitate per-transaction billing for information passing through the hub computer system.

9. The method as recited in claim 8, further comprising:
   receiving a submission of a new proposed disparate member financial services app for approval for use with the hub computer system; and
   upon approval of the proposed disparate member financial services app for use with the hub computer system, tracking customers who purchase and use the proposed disparate member financial services app; and
   routing and sending financial account and financial transaction information to the customers who purchase and use the proposed disparate member financial services app.

10. The method as recited in claim 9, further comprising receiving information relating to a referral source for the submission of the new proposed disparate member financial services app and providing a referral fee to the referral source upon approval of the proposed disparate member financial services app for use with the hub computer system.

11. The method as recited in claim 9, further comprising ensuring that the new proposed disparate member financial services app complies with requirements imposed upon the plurality of disparate member financial services apps prior to approval of the proposed disparate member financial services app for use with the hub computer system.

12. The method as recited in claim 8, further comprising calculating a payment to each bank based on a volume of financial transaction information sent from the disparate member bank computer systems associated with each bank.

13. A system for facilitating and controlling multi-application access to banking transaction information, comprising:
- a plurality of disparate banks wherein each bank comprises a bank computer system hosting customer personal financial information;
- a plurality of disparate financial services apps unaffiliated with the banks and used by a plurality of disparate customers wherein each disparate financial services app is used by a customer to control the personal financial information of that customer;
- a hub computer system comprising a server communicatively coupled to a portion of the plurality of disparate bank computer systems comprising member bank computer systems and to a portion of the plurality of disparate member financial services apps comprising member financial services apps wherein the hub computer system is configured to process communications between the plurality of member bank computer systems and the plurality of disparate member financial services apps to ensure the customer financial information is passed between each member bank computer system and each disparate member financial services app only when each disparate member financial services app complies with prerequisites selectively set by the bank hosting the customer financial information, the hub computer system comprising:
  - a communications mechanism configured to pass financial transaction information between the plurality of member bank computer systems and the plurality of disparate member financial services apps;
  - a processing system wherein the financial transaction information is parsed and the customer associated with each financial transaction is identified within the financial transaction information;
  - a routing system wherein the routing system is adapted to route information associated with each financial transaction to the identified customer through the disparate member financial services app operating on a remote customer device; and
  - a communications mechanism in communication with the remote customer device that transmits the information routed by the routing system to the disparate member financial services app on the remote customer devices of the identified customer;
- wherein the financial transaction information is only routed and communicated after the hub computer system has verified at least one time that the disparate member financial services app complies with the prerequisites set by the bank hosting the financial information, the steps for verifying compliance comprising:
  - ensuring the disparate member financial services app complies with pre-determined acceptance criteria and quality control standards set by each bank;
  - ensuring the disparate member financial services app complies with pre-determined information security, regulatory and compliance standards predetermined by each respective bank; and
  - ensuring the disparate member financial services app complies with pre-determined authentication requirements, information protection requirements, and communication requirements;
- wherein each bank only sends data to the hub computer system, each bank billing for the data received based on the amount of data from that bank whose data is delivered;
- wherein the hub computer system is adapted to receive information from multiple banks of the plurality of disparate banks for each financial services app that becomes a disparate member financial services app; and
- wherein the hub computer system is further configured to track the amount of financial information passed between the member bank computer systems and the disparate member financial services apps and to allocate a cost for all data accessed by each member financial services app and invoice each app provider providing such disparate member financial services app.

* * * * *